(12) United States Patent
Hardie et al.

(10) Patent No.: US 11,565,453 B2
(45) Date of Patent: Jan. 31, 2023

(54) TEMPERATURE CONTROL UNIT, SYSTEM, AND METHOD FOR MOLDING EQUIPMENT

(71) Applicant: Sterling Products, Inc., New Berlin, WI (US)

(72) Inventors: Timothy R Hardie, New Berlin, WI (US); John N Olson, New Berlin, WI (US)

(73) Assignee: STERLING PRODUCTS, INC., New Berlin, WI (US)

( * ) Notice: Subject to any disclaimer, the term of this patent is extended or adjusted under 35 U.S.C. 154(b) by 450 days.

(21) Appl. No.: 16/404,230

(22) Filed: May 6, 2019

(65) Prior Publication Data

US 2019/0337210 A1 Nov. 7, 2019

Related U.S. Application Data

(60) Provisional application No. 62/667,563, filed on May 6, 2018.

(51) Int. Cl.
*B29C 45/76* (2006.01)
*B29C 45/78* (2006.01)
(Continued)

(52) U.S. Cl.
CPC .......... *B29C 45/78* (2013.01); *B29C 45/1704* (2013.01); *B29C 45/74* (2013.01); *B29C 45/77* (2013.01); *B29C 2045/1739* (2013.01)

(58) Field of Classification Search
CPC ......... B29C 45/77; B29C 45/78; B29C 45/80; B29C 45/84; B29C 45/2642;
(Continued)

(56) References Cited

U.S. PATENT DOCUMENTS

| 4,721,589 A | * | 1/1988 | Harris | ..................... B29C 48/05 264/40.6 |
| 6,149,844 A | * | 11/2000 | Graham | .................. B29C 33/04 264/257 |

(Continued)

FOREIGN PATENT DOCUMENTS

| DE | 102008027039 | 12/2009 |
| EP | 0183255 A2 | 6/1986 |

OTHER PUBLICATIONS

International Search Report and Written Opinion cited in the International PCT App No. PCT/US2019/030894; dated Jul. 29, 2019; 9 pp.

*Primary Examiner* — Joseph S Del Sole
*Assistant Examiner* — Thu-Khanh T. Nguyen
(74) *Attorney, Agent, or Firm* — Lempia Summerfield Katz LLC (57) ABSTRACT

A temperature control system and method for regulating a liquid temperature in a recirculation system of a molding system includes determining an operating pressure of the liquid in the recirculation system, determining an operating temperature of the liquid in the recirculation system, receiving the operating pressure and the operating temperature, comparing the received operating temperature to a threshold temperature as a function of the operating pressure, and adjusting an output of a heat exchanger in the recirculation system when the operating temperature is beyond the threshold temperature.

17 Claims, 5 Drawing Sheets

(51) Int. Cl.
    *B29C 45/17*         (2006.01)
    *B29C 45/74*         (2006.01)
    *B29C 45/77*         (2006.01)

(58) Field of Classification Search
    CPC ....... B29C 35/007; B29C 35/02; B29C 35/04; B29C 35/041; B29C 35/043; B29C 43/58; B29C 2043/5808; B29C 2043/5816; B29C 2037/90; B29C 2037/903
    See application file for complete search history.

(56) References Cited

U.S. PATENT DOCUMENTS

2003/0197294 A1    10/2003    Shirai
2009/0174101 A1     7/2009    Johnson \* cited by examiner

| Min Pressure [PSIG] | Max Temp [F] | Pressure[barg] | Temp[C] |
|---|---|---|---|
| 8 | 210.0 | 0.552 | 98.9 |
| 8 | 215.0 | 0.552 | 101.7 |
| 8 | 220.0 | 0.552 | 104.4 |
| 8 | 225.0 | 0.552 | 107.2 |
| 8 | 230.0 | 0.552 | 110.0 |
| 10 | 235.0 | 0.689 | 112.8 |
| 12 | 240.0 | 0.827 | 115.6 |
| 14 | 245.0 | 0.965 | 118.3 |
| 16 | 250.0 | 1.103 | 121.1 |
| 20 | 255.0 | 1.379 | 123.9 |
| 24 | 260.0 | 1.655 | 126.7 |
| 26 | 265.0 | 1.793 | 129.4 |
| 30 | 270.0 | 2.068 | 132.2 |
| 34 | 275.0 | 2.344 | 135.0 |
| 38 | 280.0 | 2.620 | 137.8 |
| 42 | 285.0 | 2.896 | 140.6 |

TEMPERATURE CONTROL UNIT, SYSTEM, AND METHOD FOR MOLDING EQUIPMENT

RELATED APPLICATION DATA

This non-provisional application claims priority to and the benefit of U.S. provisional application Ser. No. 62/667,563, filed 6 May 2018 and entitled "Temperature Control Unit, System, and Method for Molding Equipment." The entire contents of this prior filed application are hereby incorporated herein by reference.

BACKGROUND OF THE INVENTION

1. Field of the Disclosure

The present disclosure is generally directed to molding equipment, and more particularly to a temperature control unit, system, and method for molding equipment.

2. Description of Related Art

Molding equipment typically includes one or more mold cavities that are formed in or defined by a mold. The mold is typically formed by two mold tools or platens, with one of the platens being stationary and one of the platens being movable relative to the stationary platen to open and close the mold cavity or cavities. In some cases, where the mold cavity is for complex shapes, the mold tool may include additional platens or slides to allow for molding and releasing the complex molded parts.

The mold platens are typically heated during operation. Hot water or oil is circulated through the material of the mold or platens. The water or oil is heated and circulated through small channels in the mold or platens, such as in an injection molding machine. The hot water or oil is heated to a desired temperature and is used to warm the mold up for production, and then to maintain the required temperature for continued production.

The water or oil system is typically a closed loop system. However, a water (or oil) supply line is typically connected to the system to provide pressure and make-up water (or oil) when the pressure drops or water (or oil) is let out of the closed process loop. In a heating application, the same water (or oil) circulates through the system, including the molding machine, and is warmed a bit more during each pass through the system, until achieving the desired or required temperature.

The water supply to a water heated system may be from a municipal or city water system or from a central water processing plant that is on-site with the molding machinery. In either case, the water supply pressure can vary from these sources and can also vary, depending on other loads on the molding equipment and water or oil delivery system. The water (or oil) pressure is thus an independent variable in the system. A variable pressure can affect the water (or oil) temperature, which can thus vary the mold equipment temperature. Temperature and pressure variations can cause numerous quality problems.

In an existing molding machine, if the closed loop water or oil system pressure reaches an undesirable low threshold, the recirculation system is turned off and stays off. A warning signal is provided to warn of the system shut down. The system is then manually restarted. In the past, a pressure switch would be used with the controller to determine if there was sufficient pressure to run the equipment or not and also to notify the controller. The pressure switch is set at a fixed pressure setting. If the pressure switch notifies the controller that the pressure has dropped below that fixed pressure setting, the unit would turn off. These problems can result in significant downtime and thus loss of manufacturing efficiency for, and revenue from, the molding equipment.

SUMMARY

In one example according to the teachings of the present disclosure, a temperature control system for molding equipment is disclosed. The system includes a heat exchanger configured to change the temperature of a liquid in a recirculation system, a pressure sensor configured to determine an operating pressure of the liquid in the recirculation system and to output a pressure signal indicating the operating pressure of the liquid, a temperature sensor configured to determine an operating temperature of the liquid in the recirculation system and to output a temperature signal indicating the operating temperature of the liquid, and a controller configured to receive the pressure signal and the temperature signal, compare the operating temperature to a threshold temperature as a function of the operating pressure, and to send a signal to the heat exchanger to change a temperature of the liquid in the recirculation system when the operating temperature of the liquid is beyond the threshold temperature.

In one example, the temperature control system can include molding equipment connected to the recirculation system. The liquid flows through a platen of the molding equipment.

In one example, the heat exchanger may be a liquid heater.

In one example, the liquid may be water.

In one example, the operating temperature of the liquid may exceed the temperature of the boiling point of the liquid at 1 atmosphere, such as 100 C for water.

In one example, the controller may be further configured to send a signal to the heat exchanger to reduce the temperature of the liquid when the operating temperature of the liquid exceeds the threshold temperature.

In one example according to the teachings of the present disclosure, a method for regulating a liquid temperature in a recirculation system of a molding system is disclosed. The method includes determining an operating pressure of the liquid in the recirculation system, determining an operating temperature of the liquid in the recirculation system, receiving the operating pressure and the operating temperature, comparing the received operating temperature to a threshold temperature as a function of the operating pressure, and adjusting an output of a heat exchanger in the recirculation system when the operating temperature is beyond the threshold temperature.

In one example, the method can include determining the threshold temperature from a plurality of threshold temperatures based on the received operating pressure.

In one example, a threshold temperature of among the plurality of threshold temperatures may be associated with one or a range of acceptable pressures.

In one example, the method can include comparing the operating pressure to one or a range of acceptable pressures and can include selecting the threshold temperature from a plurality of threshold temperatures based on the comparing.

In one example, the liquid in the recirculation system may flow through a platen of the molding system.

In one example, the heat exchanger may be a liquid heater.

In one example, adjusting the output of the heat exchanger can include reducing the output of the heat exchanger to cool the liquid when the operating temperature of the liquid exceeds the threshold temperature.

In one example, the liquid may be water or oil.

In one example according to the teachings of the present disclosure, a non-transitory computer-readable medium is disclosed. Instructions included in the non-transitory computer-readable medium, when executed by a processor, are operable to receive an operating pressure and an operating temperature of a liquid in a recirculation system of a molding system, compare the received operating temperature to a threshold temperature as function of the operating pressure, and adjust an output of a heat exchanger in the recirculation system when the operating temperature is beyond the threshold temperature.

In one example, the instructions may be further operable to compare the operating pressure to one or a range of acceptable pressures and to select the threshold temperature from a plurality of threshold temperatures based on the comparison.

In one example, the instructions may be further operable to reduce the output of the heat exchanger to cool the liquid when the operating temperature of the liquid exceeds the threshold temperature.

In one example, the liquid may be water. The operating temperature of the water may exceed 100 C.

In one example, the heat exchanger may be a liquid heater.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

This disclosure provides a temperature control unit (TCU) for water or oil recirculation type heating of molding equipment. This disclosure also provides a system and method that utilize the disclosed TCU. The disclosed TCU is an auxiliary piece of equipment to the molding machine.

The boiling point of water at normal atmospheric pressure is 212° F. (100 C). By increasing the pressure of water, the boiling point is also increased. Thus, higher non-boiling temperatures can be achieved by increasing the pressure within a closed loop heating system for molding equipment. The same is true for other liquids, such as oil. For the disclosed molding equipment heating system, other liquids may be utilized under the same principals. However, the disclosed example is described using water as the heating liquid.

Figure 1:
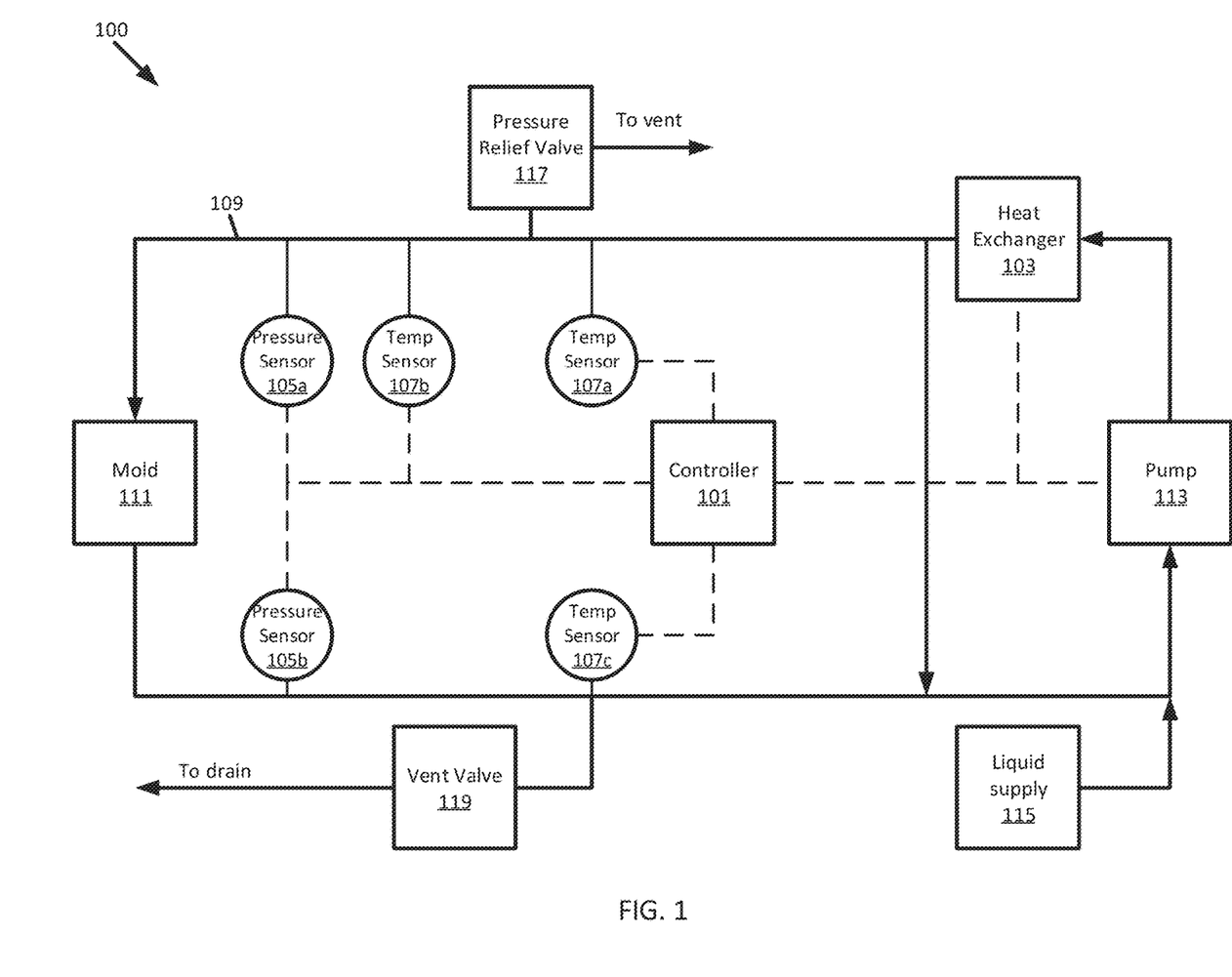
FIG. 1 shows an example temperature control system according to the teachings of the present disclosure.

FIG. 1 shows an example of a temperature control system 100 according to the present disclosure. The system 100 includes a controller 101 in communication with a heat exchanger 103. The system 100 includes pressure sensors 105a, 105b, and temperature sensors 107a, 107b, 107c. More or fewer pressure sensors 105 and temperature sensors 107 may be present. Liquid flows through conduits, channels, pipes, or other components of a recirculation system 109 of the system 100. The recirculation system 109 is in fluid communication with the heat exchanger 103, a mold 111, and a pump 113. The liquid may be supplied by a supply 115 external to the temperature control system 100. A pressure relief valve 117 may be configured to vent gas from the recirculation system 109. A vent valve 119 may be installed upstream of a drain valve of the recirculation system 109.

Figure 2:
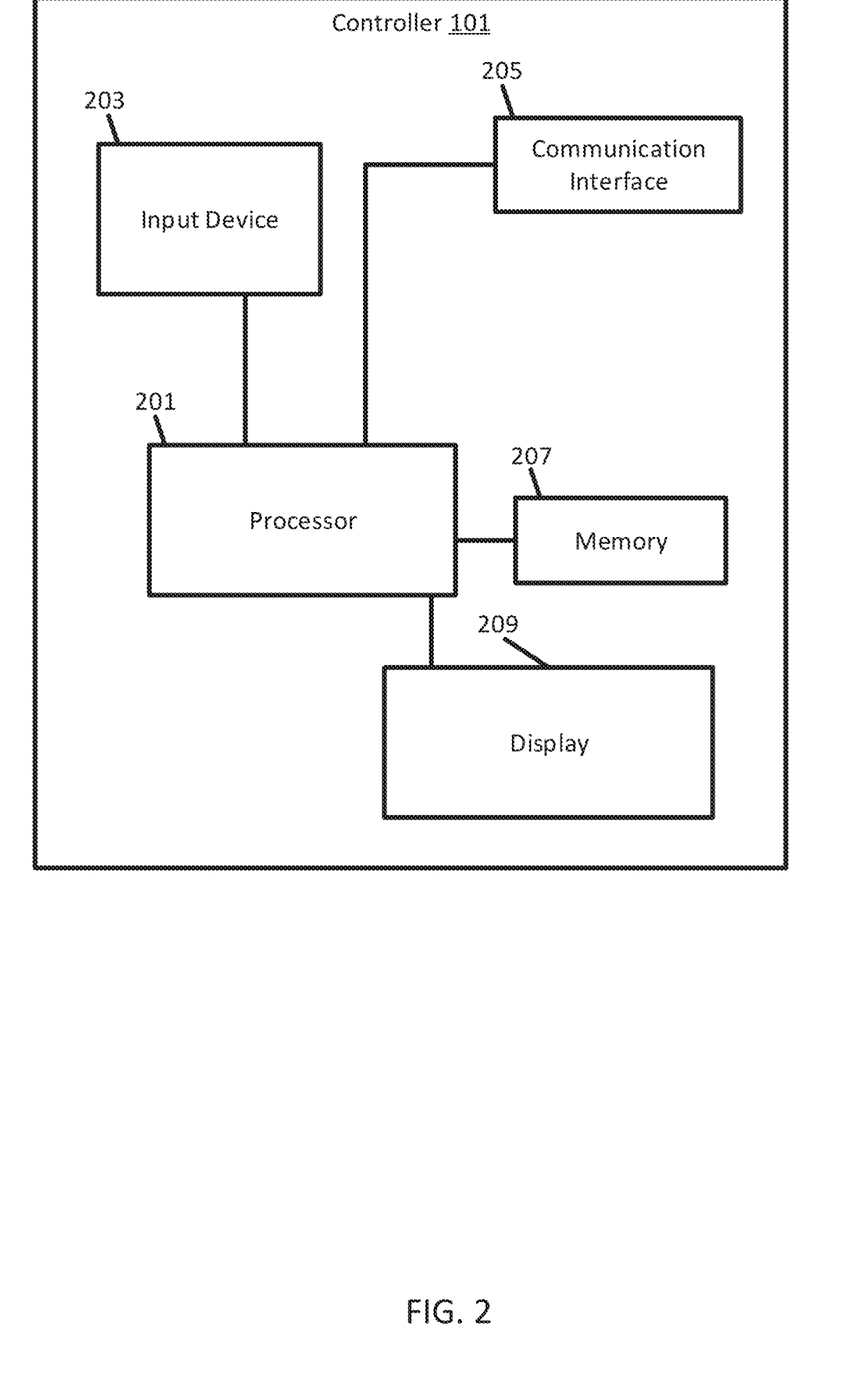
FIG. 2 shows an example controller for a temperature control system according to the teachings of the present disclosure.

The controller 101 is shown in greater detail in FIG. 2. The controller may form part of or may include the TCU. The controller 101 may be connected to multiple of the sensors 105a, 105b, 107a-107c and components of the temperature control system 100. The connections (shown with dotted lines in FIG. 1) may be direct or through a network or other connection. In this way, the controller 101 may send and receive signals between the different elements of the temperature control system 100. For example, the controller 101 may receive signals from the pressure sensors 105a, 105b indicating an operating pressure of the liquid in the recirculation system 109. The controller 101 may receive signals from the temperature sensors 107a-107c indicating a temperature of the liquid at various points in the recirculation system 109. The controller 101 may send signals to the heat exchanger 103 to change an output of the heat exchanger 103. For example, the controller 101 may send a signal to reduce an output of the heat exchanger 103 when the temperature sensors 107a-107c indicate that the liquid is too hot for the operating pressure in the recirculation system 109 (e.g. as indicated by the pressure sensors 105a, 105b). In some cases, the controller may be in communication with other elements of the temperature control system 100. For example, the controller 101 may communicate with the mold 111 to open or close the mold 111. In another example, the controller 101 may communicate with the pump 113 to start, stop, or change an operating state of the pump 113. In a further example, the controller 101 may communicate with the pressure relief valve 117 and/or the vent valve 119 to open or close the valves. By receiving signals from sensors 105, 107 and communicating with elements of the temperature control system 100, the controller 101 may regulate a temperature of the liquid in the recirculation system 109 within desired operating conditions. The controller 101 may be configured to control the temperature control system 100 according to the method described in FIG. 3.

The heat exchanger 103 may add or remove heat from the liquid in the recirculation system 109, thereby changing a temperature of the liquid. In some cases, the heat exchanger 103 may be a heater. The heater may increase a temperature of the liquid. In the case where the liquid is water, the heater may be a water heater. Because the mold 111 may function as a heat sink (e.g. the contents of the mold may absorb heat from the recirculation system), the temperature of the liquid may be reduced by turning off the heater or reducing an output of the heater for a period of time.

The pressure sensors 105 may measure, indicate, or otherwise determine a pressure of the liquid in the recirculation system 109. The pressure sensors 105 may be transducers. The pressure may be absolute or relative to the ambient atmosphere. The pressure sensors 105 may send a signal to the controller 101 representing the pressure of the liquid. Sensor 105a may measure a pressure of the liquid after the pressure relief valve 117 and prior to the mold 111.

Sensor 105*b* may measure a pressure of the liquid after the mold 111. A pressure difference between sensor 105*a* and 105*b* may indicate a leak somewhere between the sensors, for example, in the mold 111.

The temperature sensors 107 may measure, indicate, or otherwise determine a temperature of the liquid in the recirculation system 109. The temperature sensors 107 may form part of or include part of a thermostat. The temperature sensors 107 may send a signal to the controller 101 indicating a temperature of the liquid. Sensor 107*a* may measure a temperature of the liquid after the heat exchanger 103 and prior to the pressure relief valve 117. If the temperature is too high, a bypass may be closed or the volume of liquid bypassing the mold may be decreased. Likewise, if the temperature is too low, a bypass may be opened or the volume of liquid bypassing the mold (and recirculating through the heat exchanger 103) may be increased. In some cases, the pressure relief valve 117 may be opened (e.g. caused by a signal from the controller) if the temperature is high enough to boil the liquid. Sensor 107*b* may indicate a temperature of the liquid prior to the mold 111. Sensor 107*c* may indicate a temperature of the liquid after the mold 111. Sensors 107*b* and 107*c* together may indicate an amount of heat or energy lost to the mold and thereby determine a heat or energy input (or output) for the heat exchanger 103 to heat, cool, or maintain the temperature of the liquid.

The recirculation system 109 may be a series of conduits or pipes in fluid communication with one another. The recirculation system 109 may be a closed loop system. For example, during operation (e.g. after startup), the liquid in the system 109 may recirculate without any liquid being added or removed. The recirculation system 109 may be filled from the liquid supply 115. The system 109 may be drained with or without the vent valve 119 opened. The pump 113 may increase the operating pressure and flow rate of the liquid in the recirculation system 109. In some cases, the recirculation system may have a bypass line. The bypass line may bypass the mold 111. The bypass line may be used to quickly recirculate the liquid through the pump 113 and heat exchanger 103. For example, during warm up of the system, the entire volume of liquid in the system 109 may flow through the bypass line until the desired operating temperature is reached. The rate (or ratio, relative to the liquid flowing through the mold 111) of bypass may be changed to regulate the temperature of the liquid.

The mold 111 may be part of a molding system. Liquid may flow through part of the mold 111. For example, the liquid may flow through a platen of the mold 111 or through both platens or each platen and/or slide of the mold that forms the mold cavity or cavities. The liquid may exchange heat with the mold 111. Liquid-phase fluid in the recirculation system 109 may more effectively transfer heat to the mold 111 as compared to gas. In some cases, the liquid heats the mold to a desired temperature. For example, molding temperatures above 100 C may be desirable for quicker and more even resin flow within the mold 111. The operating temperature of the liquid may need to be at or above the desired molding temperature.

The pump 113 circulates the liquid in the system 109 and may increase the pressure of the liquid. The pump 113 may be driven by a motor. In some cases, the controller 101 may send signals to the pump 113 to control the operation of the pump 113. The pump 113 may be most efficient at certain inlet pressures for the liquid.

The liquid supply 115 is a supply external to the recirculation system 109. The liquid supply 115 may introduce the liquid into the recirculation system 109. For example, the liquid supply 115 may be a water supply. A valve may be operated to allow or prevent additional liquid entering the recirculation system 109 from the liquid supply 115.

The pressure relief valve 117 may relieve pressure when the liquid pressure in the system exceeds a high-pressure threshold. The relief valve 117 may open at a predetermined maximum system pressure. The pressure relief valve 117 may be located upstream of the mold 111.

The vent valve 119 may be disposed upstream of the drain valve. The vent valve 119 may vent gas from the recirculation system 109. In some cases, the vent valve 119 may be used to purge overheated liquid from the recirculation system 109 to lower the operating temperature in the recirculation system 109.

FIG. 2 shows an example controller 101 for a temperature control system. The controller may include a processor 201, and input device 203, a communication interface 205, a memory 207, and a display 209. Different or fewer components may be present. For example, the controller 101 may not have a display 209. In another example, the controller 101 may not have an input device 203.

The processor 201 may be a general processor or application specific integrated circuit. In some cases, the processor 201 is or implements a ranging data processor or pre-processor. The processor 201 may retrieve instructions from the memory 203 and execute the instructions. The processor may be configured to execute or perform the acts of the method of FIG. 3.

The input device 203 may be used for interacting with the controller 101 or to change settings of the controller 101. For example, the input device 203 may be used to manually specify a threshold temperature or to specify an operation of one of the components of the temperature control system 100, such as the heat exchanger 103. Additionally or alternatively, the input device 203 may specify a particular fluid in the recirculation system 109 and a corresponding plurality of allowable operating pressures and operating temperatures.

The communication interface 205 may provide for the exchange of information between the controller 101 and systems outside of the controller. For example, the communication interface 205 may receive the operating temperature and operating pressure from the sensors 105, 107. In another example, the communication interface 205 may send a signal from the controller to control the operation of elements of the temperature control system, such as the heat exchanger 103 or pump 113. In a further example, the communication interface 205 may communicate with a data store to retrieve the allowable operating pressures and associated maximum allowable temperature.

The memory 207 may be a volatile memory or a non-volatile memory. The memory 207 may include one or more of a read only memory (ROM), random access memory (RAM), a flash memory, an electronic erasable program read only memory (EEPROM), or other type of memory. The memory 207 may be removable from the controller 101, such as a secure digital (SD) memory card. The memory 207 may store instructions to cause the processor 201 to implement the temperature control system 100 (or to perform the acts of FIG. 3). The memory 207 may be configured to store the allowable operating pressures and associated maximum allowable temperature.

The display 509 may be a liquid crystal display (LCD) panel, light emitting diode (LED) screen, thin film transistor screen, or another type of display. The output interface of the display 509 may also include audio capabilities, or speakers. The display 509 may indicate a status or other information about the controller 101, the temperature control system 100, or the operating temperature or operating pressure.

Figure 3:
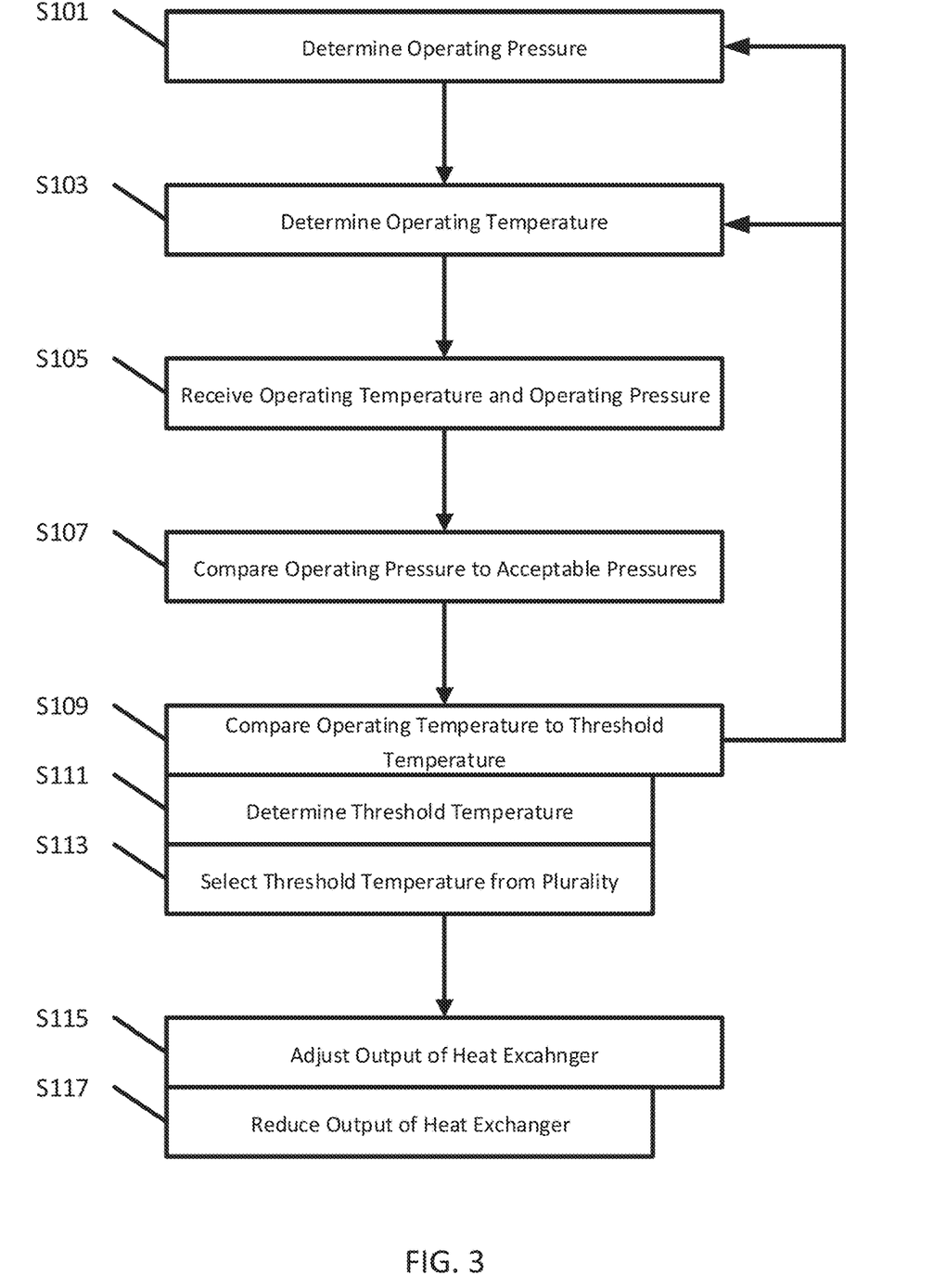
FIG. 3 shows an example flowchart for temperature control according to the teachings of the present disclosure.

FIG. 3 shows a method of controlling and regulating a liquid temperature in a recirculation system, for example, the recirculation system 109 of the temperature control system 100 of FIG. 1. The acts may be performed in a different order than shown. For example, act S101 may be performed after act S103. More, fewer, or different acts may be performed. For example, acts S101 or S103 may not be performed. The controller 101 of FIG. 1 may be configured to perform one or more of the acts of FIG. 3. For example, the acts may be stored as instructions on a memory of the controller 101 and executed by a processor of the controller 101.

In act S101, the operating pressure of the liquid is determined. In some cases, the pressure sensors 105 of FIG. 1 may determine the operating pressure. The pressure sensors 105 may send a signal to the controller 101 indicating or representing the determined operating pressure. The operating pressure may be the actual pressure of the liquid in the recirculation system 109. The operating pressure may vary over time. For example, changes in operation of the heat exchanger 103, the mold 111, the pump 113, the liquid supply 115, and the valves 117, 119 may result in changes of the operating pressure.

In act S103, the operating temperature of the liquid is determined. In some cases, the temperature sensors 107 of FIG. 1 may determine the operating temperature. The temperature sensors 107 may send a signal to the controller 101 indicating or representing the determined operating temperature. The operating temperature may be the actual temperature of the liquid in the recirculation system 109. The operating temperature may vary over time. For example, changes in operation of the heat exchanger 103, the mold 111, the pump 113, the liquid supply 115, and the valves 117, 119 may result in changes of the operating temperature.

In act S105, the operating pressure and operating temperature are received. The controller 101 may receive the operating temperature and pressure. The controller may receive the operating temperature and pressure on a periodic basis or in response to a request. In some cases, the operating temperature or operating pressure may be averaged over a number of readings or over a period of time. For example, the controller may receive 10 readings of the operating temperature or the operating pressure and take an average of the 10 readings as the value for the operating temperature or operating pressure. In another example, the controller may use an average of the temperature or pressure readings taken over a period of time, such as 5 seconds, 10 seconds, or another period of time, as the value for the operating temperature or pressure.

In act S107, the operating pressure may be compared to an acceptable operating pressure or a pressure threshold. In some cases, a minimum acceptable pressure or a maximum acceptable pressure may be specified. The operating pressure may be compared to the minimum or maximum acceptable pressure. When the operating pressure is beyond the minimum or maximum acceptable pressure, the molding process may be stopped. For example, when the operating pressure is beyond the maximum, the controller 101 may send a signal to stop the pump 113, close the bypass line, open the pressure relief valve, open the drain valve, open the vent valve 119, or perform another operation. In another example, when the pressure is below the minimum acceptable pressure, the controller 101 may send a signal to increase an operating state of the pump 113, increase an output of the heat exchanger 103, increase the amount of liquid bypassing the mold, or perform another action.

Figure 4:
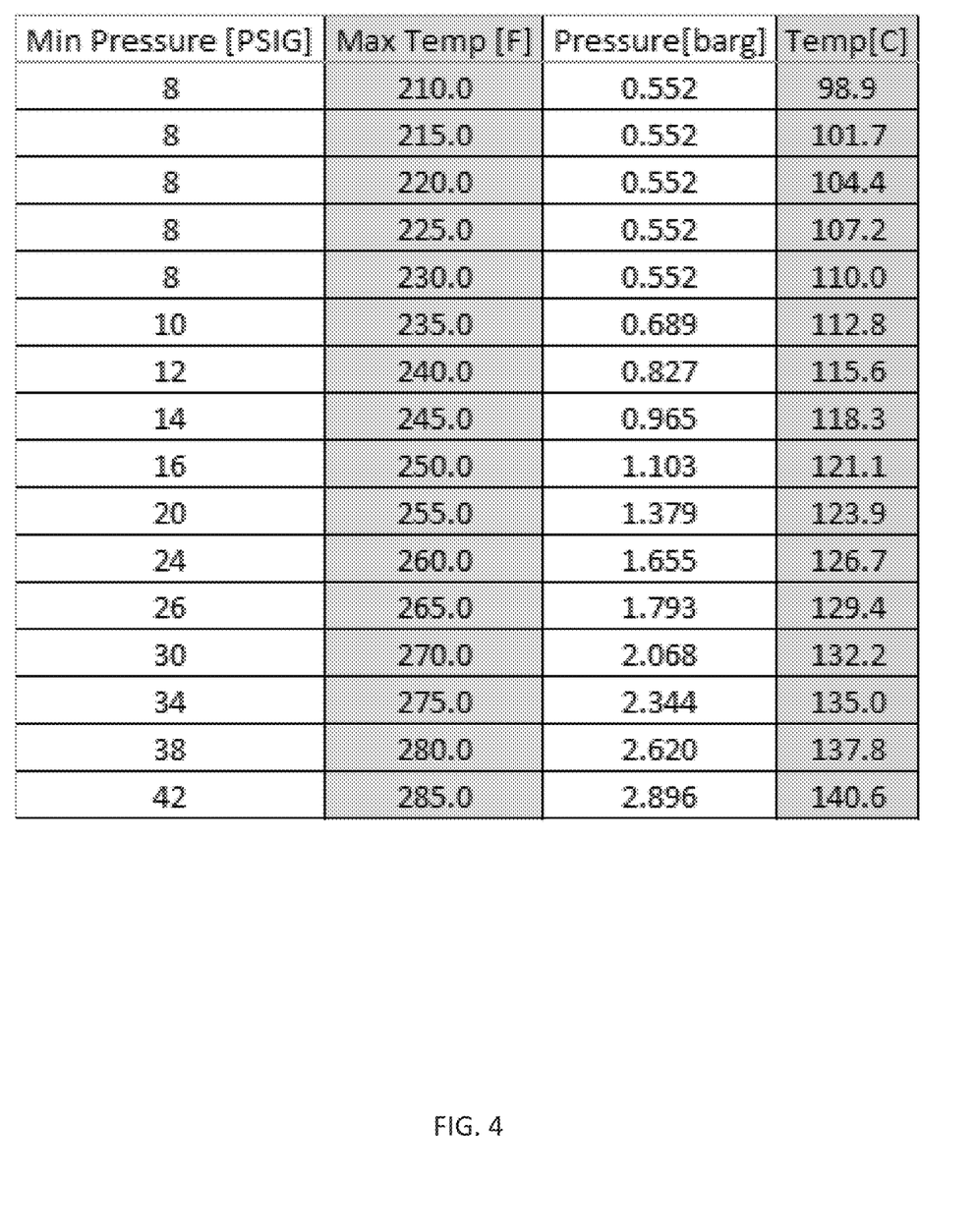
FIG. 4 shows a chart identifying various water fluid pressures and the corresponding maximum allowable temperature values to avoid reaching a water boiling condition.

Pressures between the minimum and maximum acceptable pressures may be divided into one or more ranges. For example, as illustrated in FIG. 4, each range of pressures may have a predefined minimum pressure and an associated maximum temperature. The received operating pressure may be compared to the ranges to determine which maximum temperature corresponds to the received operating pressure. For example, a received operating pressure of 31 pounds per square inch (PSI) would correspond to the range of pressures with a minimum of 30 PSI and a maximum operating temperature of 270° F.

In act S109, the received operating temperature may be compared to a threshold temperature. A maximum and a minimum threshold temperature may be predefined. In some cases, the threshold temperature may be a function of the operating pressure. For example, and as illustrated in FIG. 4, the threshold temperature may be a maximum temperature associated with a range of acceptable operating pressures. In this way, the threshold temperature may change as the operating pressure changes. Generally, increased operating pressures are associated with increased maximum threshold temperatures because the boiling point of a liquid increases with increasing pressure. For example, the boiling point of water rises above 100 C at pressures above 1 atmosphere, so the threshold temperature will rise as a function of increasing operating pressure of the water. When the operating temperature is beyond the threshold temperature, for example above a maximum threshold temperature or below a minimum threshold temperature, the controller 101 may send a signal to change the operation of one or more elements of the temperature control system 100, as in act S115.

When the operating temperature is within (e.g. not beyond) the threshold temperature, the process may repeat. For example, where the operating temperature has been determined to be below a maximum threshold temperature for the operating pressure, a new operating pressure and temperature may be determined in acts S101 and S103. In some cases, the operating pressure and the operating temperature may update at different rates, so the process may repeat with an existing or previous operating temperature or pressure. For example, where the operating temperature is updated (and the operating pressure from a previous iteration retained), the process may repeat at act S103. Likewise, where the operating pressure is updated (and the operating temperature from a previous iteration retained), the process may repeat at act S101 but skip act S103.

In act S111, the threshold temperature is determined from a plurality of threshold temperatures. As illustrated in FIG. 4, a plurality of threshold temperatures may be predefined as a function of the operating pressure. Each threshold maximum temperature may be associated with a range of acceptable operating pressures above a minimum operating pressure.

In act S113, the threshold temperature is selected from the plurality of threshold temperatures. Based on the outcome of comparing the operating pressure with the one or more ranges of acceptable operating pressures, a maximum allowable temperature may be determined. The maximum allowable temperature for the received operating temperature may be selected as the threshold temperature.

In act S115, an output of the heat exchanger is adjusted when the operating temperature is beyond the threshold. For example, when the operating temperature is below a minimum threshold temperature, the operation of the heat exchanger may be adjusted to increase a temperature of the liquid. Where the heat exchanger is a heater, the controller 101 may send a signal to increase an output of the heater. Where the heat exchanger is a chiller, the controller may send a signal to decrease an output of the chiller. In another example, when the operating temperature exceeds a maximum threshold temperature, the output of the heat exchanger may be adjusted to decrease a temperature of the liquid. Where the heat exchanger is a heater, or in act S117, the controller 101 may send a signal to decrease an output of the heater, thereby allowing the liquid to cool. Where the heat exchanger is a chiller, the controller may send a signal to increase an output of the chiller. Heat exchangers may be capable of both heating and chilling operations. Alternatively, a system may include a separate heater and chiller or just a heater or a chiller. In response to the operating temperature being beyond the threshold temperature, the controller 101 may send a signal to change the heat exchanger from heating to chilling operation, or from chilling to heating operation.

FIG. 4 shows a chart that depicts various water fluid pressures and the corresponding maximum allowable temperature values to avoid reaching a water boiling condition. The chart includes a minimum allowable pressure. For example, the minimum pressure for the unit to run may be 8 PSI. Any pressure that is below 8 PSI may be treated like a minimum or low threshold pressure switch. 8 PSI of operating pressure allows the TCU to operate at a maximum temperature of 230° F. The operating pressure may be determined for the suction side transducer, i.e., the return pressure transducer (sensor 105b in FIG. 1). This chart information can be stored by the controller (e.g. the controller 101) for comparison to the readings of the pressure transducers, as shown in FIG. 3.

A higher inlet pressure allows for higher settable maximum temperatures, also as depicted in FIG. 4. If the inlet pressure is in between two values on the chart of FIG. 4, the maximum temperature may be the next lower value. To illustrate, since 40 PSI is between two chart values of 38 PSI and 42 PSI, the TCU can select the lower pressure from the stored date of the chart. This allows a 280° F. maximum system temperature. If the TCU is set to a 280° F. temperature and the system pressure were to drop to 24 PSI, the controller may be programmed to limit the heat output of the heater to a maximum of 260° F. The controller can also be configured to display a warning indicative of the pressure drop and temperature setting change.

The controller can be configured to recognize an absolute setpoint high temperature limit. The absolute setpoint high temperature limit will remain and will override the chart data. Thus, the chart can be configured to set the maximum system temperature up to the absolute setpoint high limit value.

In one example, if the system pressure is within 5 PSI of a chart data point value for the given temperature, the controller can issue a "low pressure warning". The system can be configured to adjust accordingly. If the pressure drops below a chart data point value for the current temperature, the system response may be the same as if utilizing the previously known pressure switch. The first two columns in FIG. 4 show the pressure/temperature relationship for a water heated system. The second two columns show the metric equivalents.

If the system pressure changes during operation, the high limit of the pressure/temperature table operates dynamically. In other words, the high temperature limit changes with changing pressure during operation, instead of the equipment or heating system shutting down based on a static temperature limit that does not correspond to the boiling point of the liquid at the operating pressure.

In the disclosed examples, the return pressure transducer reads the water supply pressure. The control algorithm limits the water output based on the maximum temperature the water can be set to, as read by the delivery temperature sensor. If the system pressure drops below the limit pressure for the current or set temperature, the temperature maximum is reduced proportionally.

Figure 5:
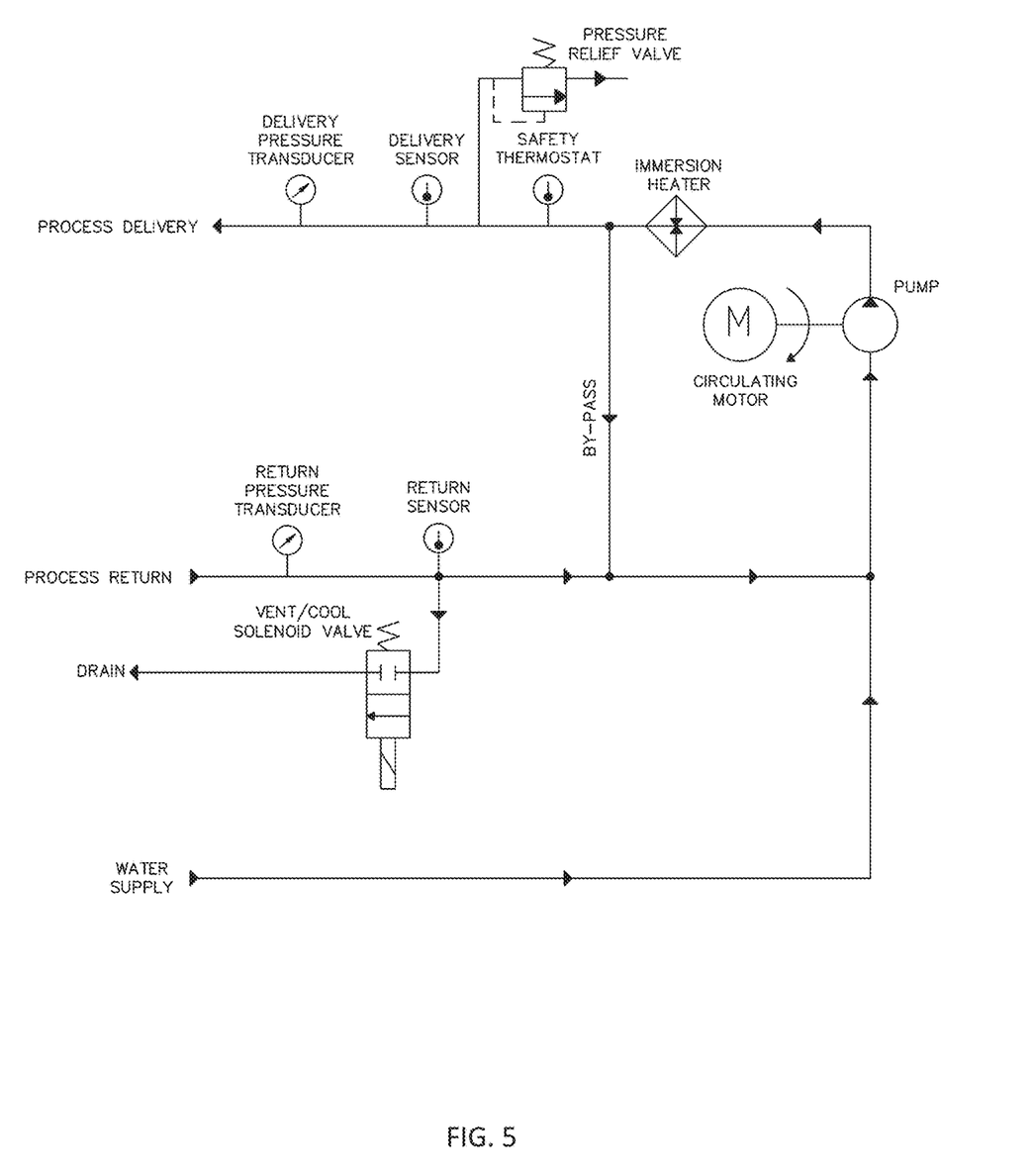
FIG. 5 shows a schematic view of one example of a temperature control unit and system according to the teachings of the present disclosure.

FIG. 5 shows a schematic of one example of a TCU and system according to the teachings of the present disclosure. In a water TCU for molding equipment, it is desirable to keep the water in a liquid state. However, it is also desirable to operate at water temperatures above 212° F. Thus, the water is pressurized in a closed loop system. As shown, the system includes an external water supply for initially filling the system and for replenishing the system, as needed. The water is delivered to the system, which includes a water pump upstream of the molding equipment for circulating the water through the closed loop path of the system. The water pump is a part of the system and also may or may not be a part of the TCU.

The TCU and system in this example have a heater that is provided to heat the water as it is circulated through the system. In this example, the heater is an immersion heater, although other types of heaters may be utilized. The TCU and system may include a bypass line for excess water to bypass the full recirculation loop. In this example, the bypass is downstream of the heater but upstream of the molding equipment. The TCU and system may include a safety thermostat that detects the water temperature of the water entering the closed loop system. The safety thermostat is upstream of the molding equipment but downstream of the bypass line in this example.

The TCU and system may also include a pressure relief valve to relieve pressure when the water pressure in the system achieves a high-pressure threshold. The relief valve can be provided to open at a desired maximum system pressure that is predetermined for a given system. In this example, the pressure relief valve is upstream of the molding equipment, but downstream of the safety thermostat.

The TCU and system may also include a water delivery sensor to monitor whether water is circulating within the system. The TCU and system further may include a delivery pressure transducer to determine the water pressure upstream of the molding equipment. The water then circulates to the molding equipment via a process delivery line or lines. The water circulates through the small channels or conduits of the mold platens and then returns from the mold platens via a process return line or lines.

The TCU and system may include a return pressure transducer that determines the water return pressure that is returning from the mold platens. Thus, the return pressure transducer is downstream of the molding equipment. The TCU and system may also include a return sensor to determine that water is recirculating from the molding equipment. At this point, the water from the molding equipment is then recirculated through the system via the pump.

The TCU and system may further include a drain valve, which can be used to evacuate the system of water. A vent/cool solenoid valve may be disposed upstream of the drain valve and in fluid communication with the process return line or lines. In this example, the solenoid valve is disposed at the return sensor. The solenoid valve may be used to vent steam, if needed, or to purge excessively heated water from the system to lower the temperature more quickly.

In the disclosed example, pressure transducers are used to read the water supply pressure. That data or information is sent to a controller. The pressure date detected by the pressure transducers is checked against corresponding maximum operating temperature. The return pressure transducer reads the water supply pressure. The controller may be programmed with a control algorithm that limits the heater output based on a maximum temperature that the water can be set to, as read by the delivery temperature sensor. If the water pressure in the system drops below a predetermined limit for the current or set temperature, the temperature maximum is reduced proportionally.

Although certain temperature control units, systems, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A temperature control system for molding equipment, the temperature control system comprising:
   a heat exchanger configured to change the temperature of a liquid in a recirculation system;
   a pressure sensor configured to determine an operating pressure of the liquid in the recirculation system and to output a pressure signal indicating the operating pressure of the liquid;
   a temperature sensor configured to determine an operating temperature of the liquid in the recirculation system and to output a temperature signal indicating the operating temperature of the liquid; and
   a controller configured to:
      receive the pressure signal and the temperature signal;
      determine a maximum threshold temperature from a plurality of maximum threshold temperatures based on the received operating pressure, wherein each maximum threshold temperature of the plurality of maximum threshold temperatures corresponds to at least one pressure within a range of pressures and is a maximum allowable temperature for the range of pressures;
      compare the operating temperature to the maximum threshold temperature as a function of the operating pressure; and
      send a control signal to the heat exchanger to change a temperature of the liquid in the recirculation system when the operating temperature of the liquid is beyond the maximum threshold temperature.

2. The temperature control system of claim 1, further comprising:
   molding equipment connected to the recirculation system, wherein the liquid flows through a platen of the molding equipment.

3. The temperature control system of claim 1, wherein the heat exchanger is a liquid heater.

4. The temperature control system of claim 1, wherein the liquid is water.

5. The temperature control system of claim 4, wherein the operating temperature of the water exceeds 100 C.

6. The temperature control system of claim 1, wherein the controller is further configured to send the signal to the heat exchanger to reduce the temperature of the liquid when the operating temperature of the liquid exceeds the maximum threshold temperature.

7. A method for regulating a liquid temperature in a recirculation system of a molding system, the method comprising:
   determining, by a pressure sensor, an operating pressure of the liquid in the recirculation system;
   determining, by a temperature sensor, an operating temperature of the liquid in the recirculation system;
   receiving, by a controller, the operating pressure and the operating temperature;
   determining, by the controller, a maximum threshold temperature from a plurality of maximum threshold temperatures based on the received operating pressure, wherein each maximum threshold temperature of the plurality of maximum threshold temperatures corresponds to at least one pressure within a range of pressures and is a maximum allowable temperature for the range of pressures;
   comparing, by the controller, the received operating temperature to the maximum threshold temperature as a function of the operating pressure; and
   adjusting, by the controller, an output of a heat exchanger in the recirculation system when the operating temperature is beyond the maximum threshold temperature.

8. The method of claim 7, further comprising:
   comparing, by the controller, the operating pressure to the range of pressures; and
   selecting, by the controller, the maximum threshold temperature from the plurality of maximum threshold temperatures based on the comparing.

9. The method of claim 7, wherein the liquid in the recirculation system flows through a platen of the molding system.

10. The method of claim 7, wherein the heat exchanger is a liquid heater.

11. The method of claim 7, wherein adjusting the output of the heat exchanger further comprises:
    reducing, by the controller, the output of the heat exchanger to cool the liquid when the operating temperature of the liquid exceeds the maximum threshold temperature.

12. The method of claim 7, wherein the liquid is water or oil.

13. A non-transitory computer-readable medium including instructions that, when executed by a processor, are operable to:
    receive an operating pressure and an operating temperature of a liquid in a recirculation system of a molding system;
    determine a maximum threshold temperature from a plurality of maximum threshold temperatures based on the received operating pressure, wherein each maximum threshold temperature of the plurality of maximum threshold temperatures corresponds to at least one pressure within a range of pressures and is a maximum allowable temperature for the range of pressures;
    compare the received operating temperature to the maximum threshold temperature as function of the operating pressure; and
    adjust an output of a heat exchanger in the recirculation system when the operating temperature is beyond the maximum threshold temperature.

14. The non-transitory computer-readable medium of claim 13, further including instructions operable to:
    compare the operating pressure to the one or the range of pressures; and select the maximum threshold temperature from the plurality of maximum threshold temperatures based on the comparison.

15. The non-transitory computer-readable medium of claim 13, further including instructions operable to:
reduce the output of the heat exchanger to cool the liquid when the operating temperature of the liquid exceeds the maximum threshold temperature.

16. The non-transitory computer-readable medium of claim 13, wherein the liquid is water, and wherein the operating temperature of the water exceeds 100 C.

17. The non-transitory computer-readable medium of claim 13, wherein the heat exchanger is a liquid heater.

\* \* \* \* \*